(12) United States Patent
Lin

(10) Patent No.: US 8,414,727 B2
(45) Date of Patent: Apr. 9, 2013

(54) METHOD FOR SECURING BOTTOM PIECE TO PAPER-MADE CONTAINER

(76) Inventor: Pei-Ti Lin, Taipei (TW)

( * ) Notice: Subject to any disclaimer, the term of this patent is extended or adjusted under 35 U.S.C. 154(b) by 20 days.

(21) Appl. No.: 13/067,794

(22) Filed: Jun. 28, 2011

(65) Prior Publication Data

US 2013/0000817 A1    Jan. 3, 2013

(51) Int. Cl.
*B32B 37/12* (2006.01)
*B65D 3/12* (2006.01)

(52) U.S. Cl.
USPC ............ 156/245; 156/69; 156/293; 220/612; 229/400; 264/262; 264/263; 493/94; 493/128

(58) Field of Classification Search ............ 156/69; 264/268; 229/404, 941; 493/94, 114, 128; 403/269; B65D 3/10, 3/12
See application file for complete search history.

(56) References Cited

U.S. PATENT DOCUMENTS 4,493,860 A * 1/1985 Callahan ............... 427/230

FOREIGN PATENT DOCUMENTS

| JP | 10024919 A | * | 1/1998 |
| JP | 11157526 A | * | 6/1999 |
| JP | 11171161 A | * | 6/1999 |

OTHER PUBLICATIONS

Machine translation of JP-10024919A (Takasaki), 1998, 4 pages.*
Machine translation of JP-11157526A (Wada), 1999, 6 pages.*
Machine translation of JP-11171161A (Miyake), 1999, 9 pages.*

* cited by examiner

*Primary Examiner* — William Bell
(74) *Attorney, Agent, or Firm* — Jackson IPG PLLC

(57) ABSTRACT

A method for securing a bottom piece to a paper-made container forms first and second glue layers in one injection molding process. The method includes a mold set has a first concavity located corresponding to the open top of the paper-made container and communicating with a pouring path of an entrance via a first passage in the mold. A second concavity is defined in the mold and communicates with a second passage which communicates with the pouring path via a hole defined through the bottom piece. The two glue layers are formed within one molding process while the bottom piece is connected to the paper-made container.

6 Claims, 6 Drawing Sheets

METHOD FOR SECURING BOTTOM PIECE TO PAPER-MADE CONTAINER

BACKGROUND OF THE INVENTION

1. Field of the Invention

The present invention relates to an improved method for securing a bottom piece to a paper-made container.

2. Description of Prior Art

The conventional disposable containers generally include plastic-made containers and paper-made containers, wherein the plastic-made containers are gradually replaced by the paper-made containers. However, the paper-made containers do not have sufficient structural strength which has to be obtained by increasing the thickness of the paper sheets, and this will increase the cost of manufacturing and need more paper pulps which mean more forests have to be destroyed. A known method for securing the bottom piece to a paper-made container discloses two respective glue layers formed on the top and the bottom of the container. The glue layers are made by bio-degradable material. However, the two respective glue layers have to be made by two times of molding processes or by using two-way injection molding machine. The conventional methods require longer processing time or higher cost.

The present invention intends to provide an improved method to improve the inherent shortcomings of the conventional method for securing the bottom piece to the paper-made container.

SUMMARY OF THE INVENTION

The present invention relates to a method for securing a bottom piece to a paper-made container, and comprises a mold set having a first concavity and a second concavity, wherein the first concavity is located corresponding to the open top of a paper body of the paper-made container and communicates with a pouring path of an entrance via a first passage. The second concavity communicates with a second passage which communicates with the pouring path via a hole defined through the bottom piece so as to form a first glue layer on the open top of the paper body and a second glue layer on the back of the bottom piece.

The primary object of the present invention is to provide a method for securing a bottom piece to a paper-made container by way of injection molding, and the first and second glue layers are formed within one process.

The other object of the present invention is to provide a method for securing a bottom piece to a paper-made container, wherein the structural strength of the container is reinforced.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
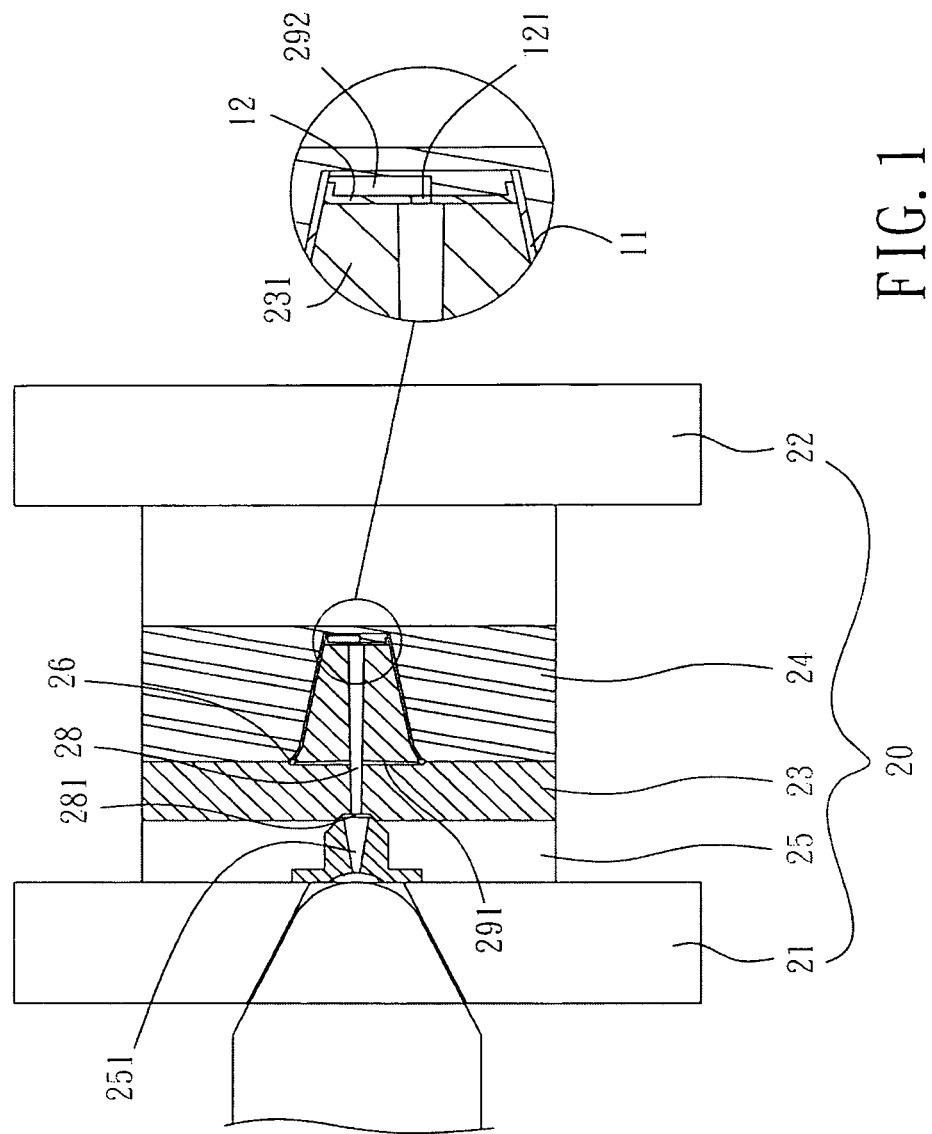
FIG. 1 is a partial cross sectional view to show the first embodiment of the method of the present invention wherein the paper container is formed in the mold set.

Referring to FIGS. 1 to 5, the method for securing a bottom piece to a paper-made container of the present invention comprises a paper-made container 10, a mold set 20 and a first and second glue layers 13, 14. The paper-made container 10 is composed of a paper body 11 and a bottom piece 12. The mold set 20 has a first frame 21 and a second frame 22, both of which are connected to a first mold 23, a second mold 24 and a third mold 25. The paper body 11 and the bottom piece 12 are located in the mold set 20 and the first and second glue layers 13, 14 are formed in the mold set 20.

The paper body 11 is a cylindrical member with two open ends, and the outer surface of the paper body 11 includes multiple ridges as shown. The first glue layer 13 is formed on the open top of the paper body 11 and the second glue layer 14 is formed to the open bottom of the paper body 11. The bottom piece 12 is connected to the open bottom where the bottom piece 12 is connected. A hole 121 is defined through the bottom piece 12 such that the melted plastic material flows therethrough.

A first concavity 26 is defined in the first and second molds 23, 24 of the mold set 20 and the first concavity 26 is located corresponding to the open top of the paper body 11 of the paper-made container 10 so as to form the first glue layer 13. A second concavity 27 is defined in the first and second molds 23, 24 of the mold set 20 and the second concavity 27 is located corresponding to the open bottom of the paper body 11 of the paper-made container 10 so as to form the second glue layer 14. An entrance 251 is defined in the third mold 25 and located at an end of the first mold 23. An inlet 281 and a pouring path 28 are defined in the first mold 23 at the entrance 251. The pouring path 28 extends through the core 231 of the first mold 23 and communicates with hole 121 of the bottom piece 12 when the paper body 11 and the bottom piece 12 are located in the mold set 20.

A first passage 291 and a second passage 292 are defined between the first and second molds 23, 24, wherein the first passage 291 is in communication between the pouring path 28 and the first concavity 26. The second passage 292 communicates between the second concavity 27 and the pouring path 28 via the hole 121. Preferably, the number of the second passage 292 is three so that after the plastic material is solidified, three ribs 122 are formed.

Figure 2:
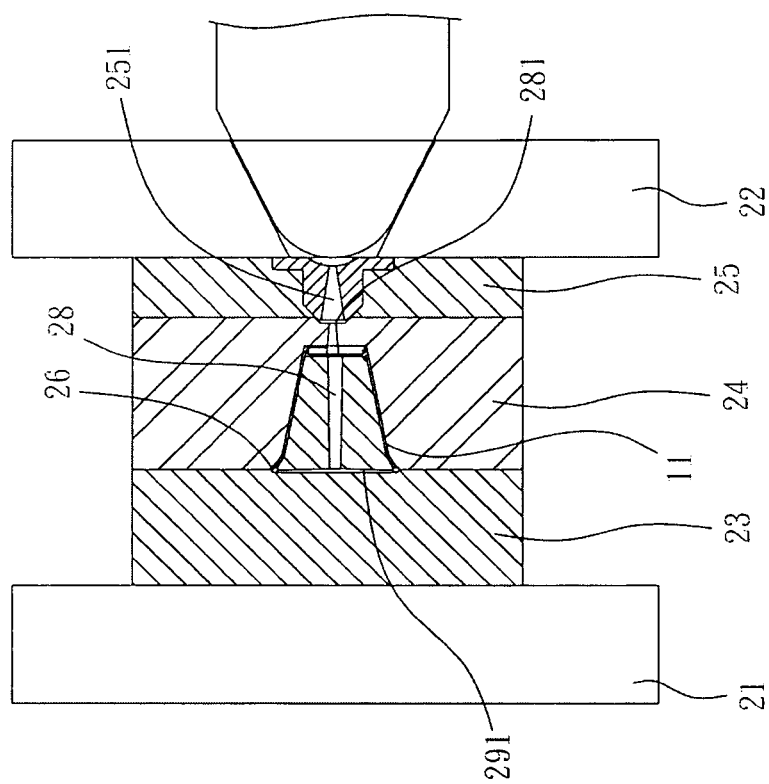
FIG. 2 is a partial cross sectional view to show the second embodiment of the method of the present invention wherein the paper container is formed in the mold set.
Figure 3:
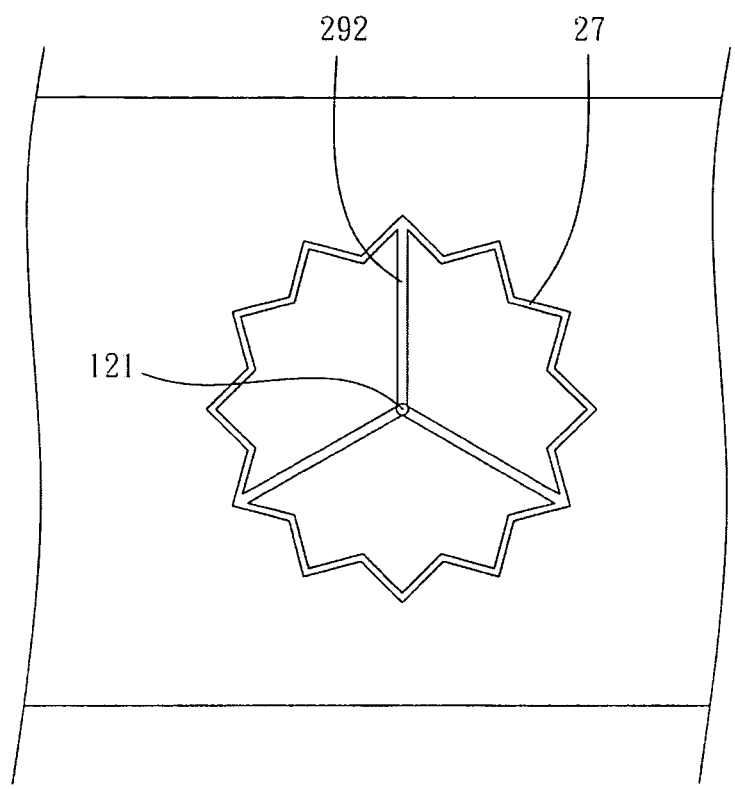
FIG. 3 shows that the second passage and the second concavity of the mold set in the method of the present invention.
Figure 4:
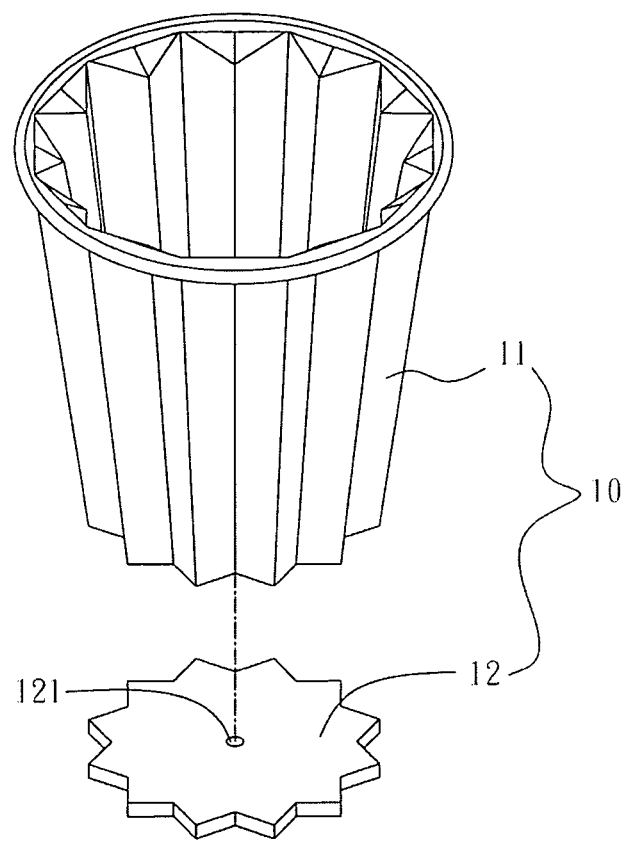
FIG. 4 is an exploded view to show the paper-made container made by the method of the present invention.
Figure 5:
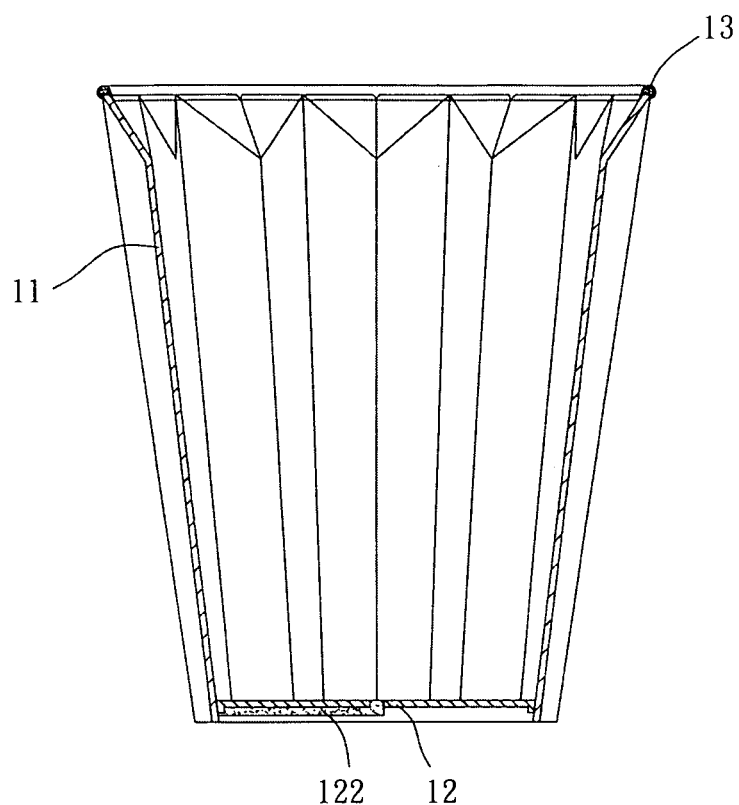
FIG. 5 is a cross sectional view of the paper-made container made by the method of the present invention.
Figure 6:
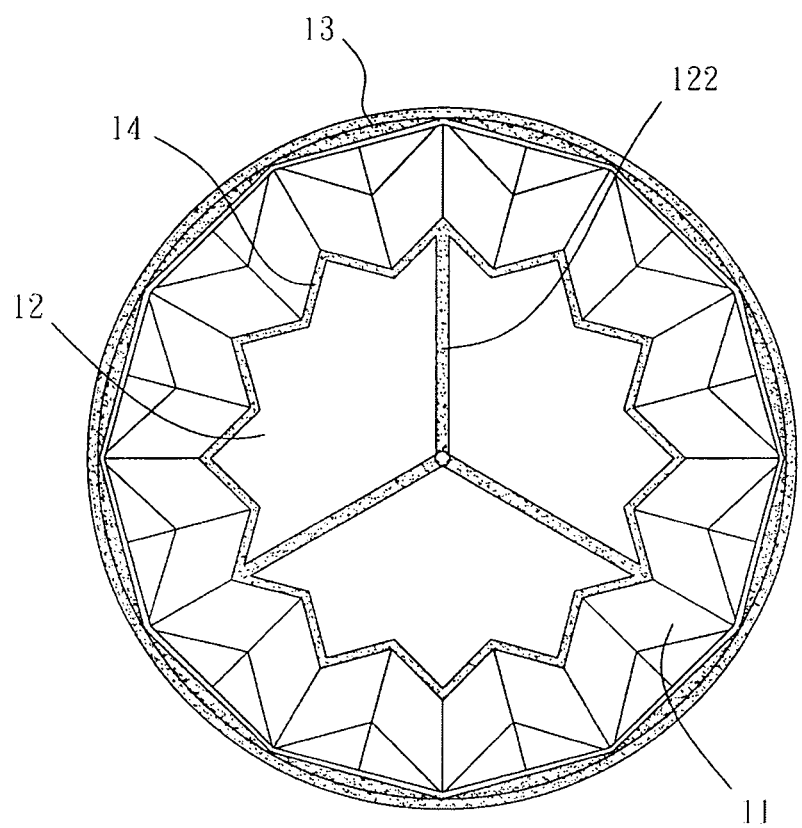
FIG. 6 is a bottom view of the paper-made container made by the method of the present invention.

As shown in FIG. 2, when the third mold 25 and the entrance 251 are located at one end of the second mold 24, the inlet 281 of the pouring path 28 is defined in the second mold 24. The pouring path 28 extends through the core 231 of the first mold 23 and communicates with the first and second passages 291, 292.

Accordingly, when the first glue layer 13 is formed on the open top of the paper-made container 10, the second glue layer 14 on the back of the bottom piece 12 is secured with the ribs 122 so that the bottom piece 12 is firmly connected to the paper body 11 and the cost for manufacturing the paper-made container 10 is reduced.

While we have shown and described the embodiment in accordance with the present invention, it should be clear to those skilled in the art that further embodiments may be made without departing from the scope of the present invention.

What is claimed is:

1. A method for securing a bottom piece to a paper-made container, and comprising:
   providing a mold set having a first concavity and a second concavity;
   placing a paper container body and a bottom piece in the first and second concavity respectively, the first concavity located corresponding to an open top of the paper body of the paper-made container and communicating with a pouring path of an entrance via a first passage;
   injecting glue into the entrance of the pouring path so as to fill the first and second concavities, the second concavity communicating with at least one second passage which communicates with the pouring path via a hole defined through the bottom piece so as to form a first glue layer on the open top of the paper body and a second glue layer on a back of the bottom piece; and
   removing the container from the mold set with the bottom piece adhered to the paper container body.

2. The method as claimed in claim 1, wherein the first and second concavities are respectively defined in a first mold and a second mold, the entrance is located at an end of the first mold and an inlet of the pouring path is defined in the first mold, the pouring path extends through a core of the first mold and communicates with the first and second passages.

3. The method claimed in claim 2, wherein a number of the second passage is three.

4. The method as claimed in claim 1, wherein the first and second concavities are respectively defined in a first mold and a second mold, the entrance is located at an end of the second mold and an inlet of the pouring path is defined in the second mold, the pouring path extends through a core of the first mold and communicates with the first and second passages.

5. The method claimed in claim 4, wherein a number of the second passage is three.

6. The method as claimed in claim 1, wherein a number of the second passage is three.

* * * * *